(12) United States Patent
Yoss

(10) Patent No.: US 6,283,051 B1
(45) Date of Patent: Sep. 4, 2001

(54) SMALL SEED DISPENSER

(76) Inventor: Elvis D. Yoss, 1415 Monterey Dr., Boulder City, NV (US) 89005

( * ) Notice: Subject to any disclaimer, the term of this patent is extended or adjusted under 35 U.S.C. 154(b) by 0 days.

(21) Appl. No.: 09/224,572

(22) Filed: Dec. 30, 1998

(51) Int. Cl.$^7$ .................................................. A01C 7/00
(52) U.S. Cl. ................................... 111/185; 111/177
(58) Field of Search ..................... 111/177, 178, 111/179, 183, 185, 913; 221/277, 278

(56) References Cited

U.S. PATENT DOCUMENTS

| | | | |
|---|---|---|---|
| 3,387,746 | * 6/1968 | Whipple | 111/179 |
| 3,637,108 | 1/1972 | Loesch . | |
| 3,731,842 | 5/1973 | Schlegel . | |
| 3,796,346 | 3/1974 | Ribouleau . | |
| 3,881,631 | 5/1975 | Loesch . | |
| 3,891,120 | 6/1975 | Loesch . | |
| 4,026,437 | * 5/1977 | Biddle | 111/179 |
| 4,145,980 | * 3/1979 | Boots | 111/188 |
| 4,210,260 | * 7/1980 | Luttrell | 221/278 |
| 4,399,757 | * 8/1983 | Maury | 111/179 |
| 4,688,698 | 8/1987 | Holland . | |
| 4,703,868 | * 11/1987 | Shaw | 221/278 |
| 4,896,616 | 1/1990 | Wintersteiger . | |
| 4,917,029 | * 4/1990 | Upadhyaya et al. | 111/185 |
| 5,143,002 | 9/1992 | Gaspardo . | |
| 5,170,909 | 12/1992 | Lundie . | |
| 5,325,801 | 7/1994 | Fiorido . | |
| 5,392,707 | 2/1995 | Romans . | |
| 5,401,035 | * 3/1995 | Schoenmaekers | 111/185 |
| 5,501,366 | 3/1996 | Fiorido . | |
| 5,535,689 | * 7/1996 | Anderson et al. | 111/177 |
| 5,535,917 | 7/1996 | Ribouleau . | |
| 5,542,364 | 8/1996 | Romans . | |
| 5,740,747 | * 4/1998 | Stufflebeam et al. | 111/185 |
| 5,842,428 | * 12/1998 | Stufflebeam et al. | 111/185 |
| 6,109,193 | * 8/2000 | Crabb et al. | 111/185 |

FOREIGN PATENT DOCUMENTS

| | | |
|---|---|---|
| 2414287 | 8/1979 | (FR) . |
| 0338883 | 10/1989 | (FR) . |
| 2110911 | * 6/1983 | (GB) . |
| 0808026 | 2/1981 | (SU) . |
| 1521330 | 11/1989 | (SU) . |

* cited by examiner

Primary Examiner—Thomas B. Will
Assistant Examiner—Nathan Mammen
(74) Attorney, Agent, or Firm—Philip J. Anderson; Anderson & Morishita

(57) ABSTRACT

A device for dispensing small seeds in which a movable seed carrier plate containing seed receptacles carries seed receptacles to first and second positions. In the first position, a vacuum source draws seeds from a seed reservoir into the seed receptacles. The seed carrier plate then carries the seed receptacles to a second position where a pressure source pushes the seeds from the seed receptacles.

5 Claims, 4 Drawing Sheets

SMALL SEED DISPENSER

FIELD OF THE INVENTION

The present invention relates to the field of seed planting. Specifically, the present invention relates to accurately metering and dispensing small, light seeds such as garlic and celery seeds.

BACKGROUND OF THE INVENTION

Historically, planting small seeds was a labor intensive job. Methods such as broadcasting, where the seeds would be scattered onto a field, were typically employed. Needless to say, the seeds were not spaced properly by this method. Thus, expensive and time-consuming labor would be required to thin the plants after the seeds had sprouted to prevent the plants from inhibiting the growth of neighboring plants. Further the seeds are not efficiently planted since thinning is required. Further the random nature of planting resulting from broadcasting detracts from automated cultivation since row and plant spacing may be non-uniform.

Another technique was to adhere the seeds in a spaced relationship on a fabric or paper planting tape which is rolled into a furrow and covered. These planting tapes are typically of a short length, e.g. 5 feet for a garden strip or a field strip may be 100–1000 feet, which therefore requires a great deal or labor to place and string planting tapes together end-to-end to plant a large field. However, planting tapes provide for efficient and labor saving planting of seeds since the amount of thinning is reduced due to the spacing of the seeds on the tape and the confining of the seeds to the rows defined by the planting tape.

A variety of devices have been invented to more accurately meter and dispense seeds. For example, Loesch et al. (U.S. Pat. No. 3,637,108) discloses a seed planter in which seeds are deposited into holes in a drum. A positive pressure holds the seeds in place while they are conveyed to a position to be mechanically dislodged from the holes or dislodged by a burst of air to fall into discharge tubes where the seeds are dropped. The seeds are carried down the tubes by the air under pressure in the drum. One of the drawbacks of this arrangement is that the device is complicated requiring seals about the discharge tubes whose ends extend into the drum. Further, for light seeds the turbulents within the drum created by the positive pressure may prevent the seeds from being directed into the discharge tubes or effectively carried to the desired location for disposition.

In Romans (U.S. Pat. No. 5,392,707) a vacuum is used to draw a seed into pockets in a rotating wheel. The wheel transports the seeds to a position where the vacuum is relieved and the seeds fall by their own weight for planting. One of the drawbacks of this device is that small, light seeds may not fall when the vacuum released and may tend to stick to the wheel due to static attraction caused by the flowing air of the the discharge openings.

In Holland (U.S. Pat. No. 4,688,698) a seed dispensing mechanism is disclosed which imposes a vacuum to pick up seeds in an etched plate and drops the seeds by releasing the vacuum. The etched apertures in the rotating plate are arranged radially whereupon entire rows of seeds are released. A drawback of this type of device is that there is no positive ejection of the seeds to permit more precise placement. The seeds fall due to gravity which, for lighter and smaller seeds, may result in inadvertent dispersal as a result of wind, dust and the like. Further, the mass dropping of entire rows of seeds further detracts from precise placement of seeds in the soil or on planting strips.

Significantly, the devices in the prior art, are not well suited for dispensing small seeds such as garlic, celery and the like. Those prior devices rely on the weight of the seed to release the seed for planting are not suitable in that the smaller seeds may adhere to components due to electrostatic attraction or may be dispersed by wind not only of environmental sources but due to turbulents from the planting equipment such as the tractor, plow or the like. It is further clear that small seeds may be so light that the weight of the seed itself is not enough to dislodge the seed from the seed carrier. Moreover, the weight of the seed may not be enough to force the seed through the dispensing tube, thereby creating a blockage in the dispensing tube. Still further the devices of the type described above tend to dispense seeds en masse which further frustrates more precise planting and disposition on planting tapes.

Still further, the devices described above are operated by either a vacuum or by positive pressure. A significant portion of the energy of compression is lost by only using the discharge side of the vacuum pump or compressor to operate the device.

Thus, it can be appreciated that there is a need in the art for a device which can meter and dispense small seeds accurately for planting and for use on seed tapes, which is of simple construction and is energy efficient.

SUMMARY OF THE INVENTION

There is, therefore, set forth according to the present invention a device which provides for more precise dispensing of small seeds for planting or disposition on planting tapes, which is of simple construction and which is efficient.

Toward this end the device according to the present invention includes a housing including a circular face with at least one radially extending seed channel adapted to receive and contain seeds and a discharge opening angularly displaced from the channel. In a preferred embodiment, four seed channels are disposed at relative angular positions of 90° with the discharge embodied as four sets of five radially aligned disposed discharge openings offset 45° from the seed channels. A circular seed carrier plate is rotatably disposed in the housing and has a first side adapted to mate with the housing face and a second side. The seed plate has a plurality of radially disposed seed receptacles each adapted to nest a seed retrieved from a seed channel. Means are provided for rotating the plate to move the receptacles between the channel(s) and the discharge opening(s). Means are also provided for imposing a vacuum at the plate second side from a position where, during rotation of the plate, the receptacles register with the channel to a position proximate the discharge to capture seeds from the channel in the receptacles and for transportation, during rotation, to the discharge. At the discharge means are included for imposing positive pressure at the plate second side to dislodge said seeds from the receptacles and propel them through said discharge.

In the preferred embodiment where there are five discharge openings defining each discharge, each opening providing an inlet to a conduit adapted to direct the propelled seed to the desired location. Also in the preferred embodiment, the receptacles on the plate are arranged in a helical fashion such that at each discharge set of the five openings, a receptacle is aligned to dispense a seed at each discharge set for a total of four seeds at a time. The conduits are arranged so as to space the discharged seeds in a desired pattern and interval.

By propelling the seeds from the plate, the lighter seeds can be carried to the desired location be it a furrow or for disposition onto a planting tape.

To increase the efficiency of the device, the vacuum and pressure means may be provided by a vacuum pump or compressor having its vacuum and positive pressure sides connected to the housing.

An object of the present invention is to provide a seed dispensing machine which is more accurate than methods such as broadcasting in which the seeds are scattered indiscriminately onto a field, thereby eliminating expensive labor for thinning the plants.

A further object of the present invention is to provide a method whereby small seeds may be planted accurately while avoiding common problems caused by the weight and shape of small seeds such as clogging of the seed delivery tubes.

Another object of the present invention is to provide a seed dispensing machine which can accommodate small seeds of various sizes and shapes.

Also, an object of the present invention is to provide a seed dispensing machine which can place small seeds accurately on a seed tape for later planting.

Yet a further object is to provide a simple and efficient device for accurate planting of small seeds.

BRIEF DESCRIPTION OF THE DRAWINGS

These and other features and advantages will become better appreciated when the same becomes better understood with reference to the specification, claims and drawings wherein:

DESCRIPTION

Figure 1:
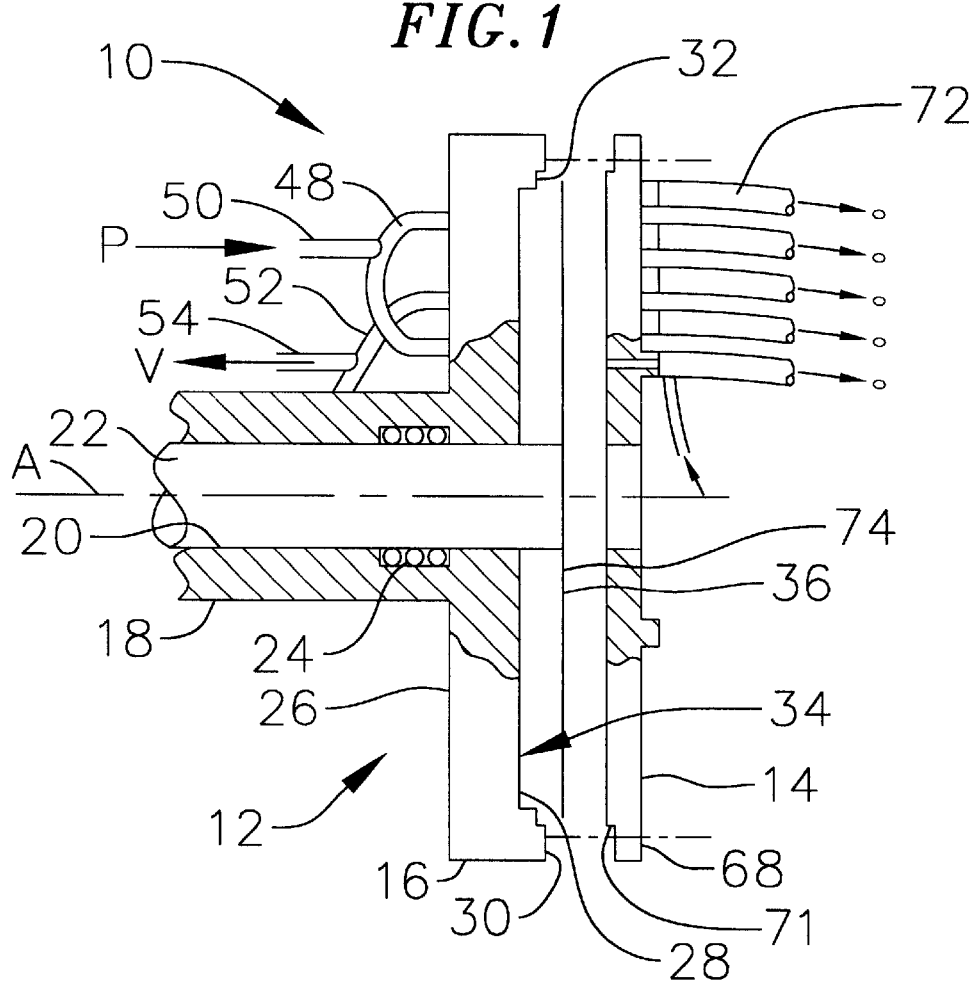
FIG. 1 is a side, partial section, exploded view of the assembled seed dispensing device according to the present invention.

Turning to FIG. 1, the device 10 according to the present invention is shown. The device 10 includes an assembled housing 12 having a discharge plate 14 and a base plate 16. The discharge plate 14 and base plate 16 are, as shown in FIGS. 2A, 2B, 4A and 4B circular about an axis A for the device 10.

With reference to the base plate 16, it includes a cylindrical stem 18 which may be integrally manufactured with the base plate 16 or fashioned as a separate component. The cylindrical stem 18 is oriented along axis A and has an axial bore 20 to accommodate a drive shaft 22 coupled to a tractor power take off (PTO) motor or other motive device. Roller bearings 24 journal the drive shaft 22 for rotation in the housing 12.

Figure 2A:
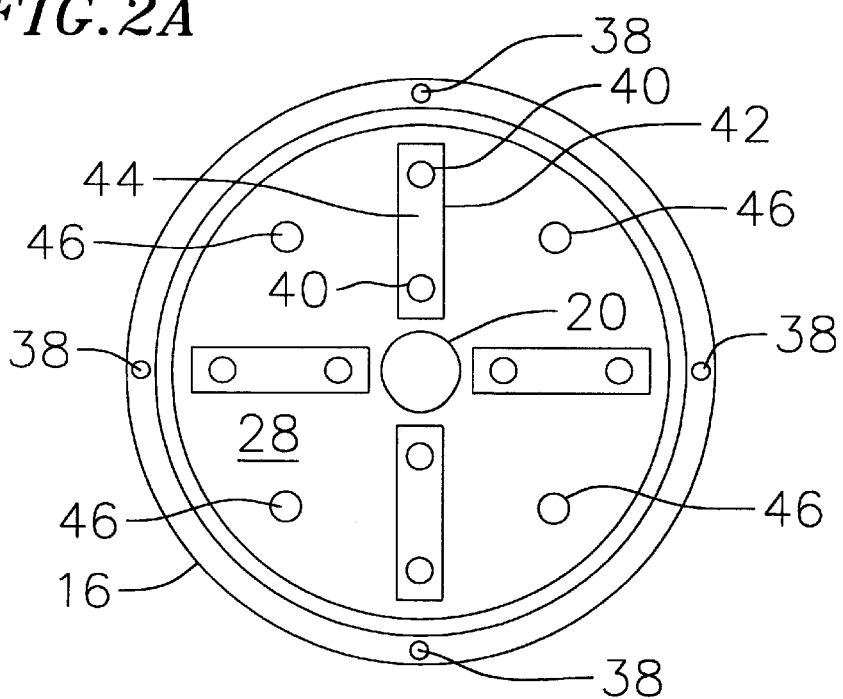
FIG. 2A is an end view of a portion of the housing for the device for providing a vacuum and pressure.

The base plate 16 has an outside surface 26 and an inside face 28. The inside face 28 is machined smooth and extends from the bore 20 to a lip 30. Lip 30 is radially stepped to define a seat 32 for aligning and mounting the discharge plate 14 and a circular space 34 to accommodate a thin, circular seed carrier plate 36. At the lip 30, threaded bores 38 as shown in FIG. 2A are provided and spaced about the perimeter of the base plate 16 to receive threaded fasteners such as bolts for coupling the discharge plate 14 to the base plate 16. While only four threaded bores 38 are shown, it is to be understood that more would typically be provided about the perimeter of the base plate 16.

To provide pressurized air through the base plate 16 for the purposes of which will hereinafter become evident, the base plate 16 includes a plurality of pressure bores 40 arranged in radially aligned pairs and distributed at 90° intervals about the base plate 16 as shown in FIG. 2A. Disposed about the pairs of pressure bores 40 is a sealing gasket 42 which may be fashioned from, for example, TEFLON® tape or other sliding friction seal. As shown in FIG. 2A, each gasket 42 has a rectangular configuration to define therein a pressure zone 44.

With continued reference to FIG. 2A, the base plate 16 also includes vacuum bores 46 disposed at 900 intervals on the base plate 16 and offset 45° with respect to the pressure bores 40.

Figure 2B:
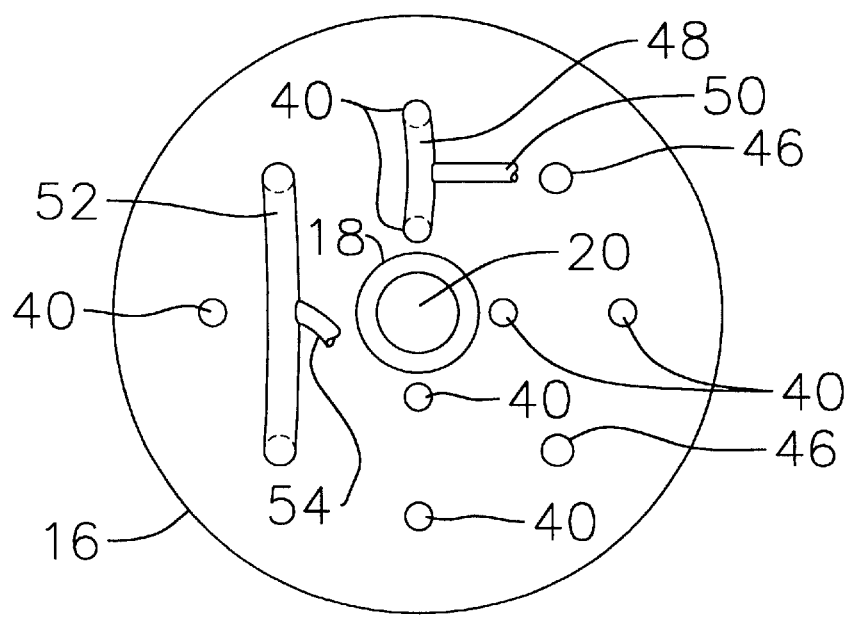
FIG. 2B is a view of the outside of the portion of the housing shown in FIG. 2A.

With reference to FIG. 1 and 2B, to supply pressurized gas such as air to the pressure bores 40, suitable fittings (not shown) are provided at the outside face 26 with each of the pairs of the pressure bores 40 coupled to a pressure manifold 48 which in turn is coupled to a pressure conduit 50 in communication with a source of pressurized air. While only one pair of pressure bores 40 is shown in FIG. 2B as coupled to their pressure manifold 48 and pressure conduit 50, it is to be understood that the other pressure bores 40 would be placed in communication with the source of pressurized air in a similar fashion. Accordingly by virtue of the conduits 50 and pressure manifolds 48, pressurized air is supplied to the pressure conduits 40.

In a like fashion, the vacuum bores 46 at the outside surface 26 include fittings (not shown) two of which are connected to a vacuum manifold 52 which in turn is connected to a vacuum conduit 54. Accordingly it is seen that the pairs of the vacuum bores 46, by virtue of the vacuum manifold 52 and vacuum conduit 54 are placed in communication with a vacuum source as hereinafter described. While only one vacuum manifold 52 is shown in FIG. 2B, it is to be understood that the other vacuum bores 46 would be connected to the vacuum source in a like fashion.

Figure 4A:
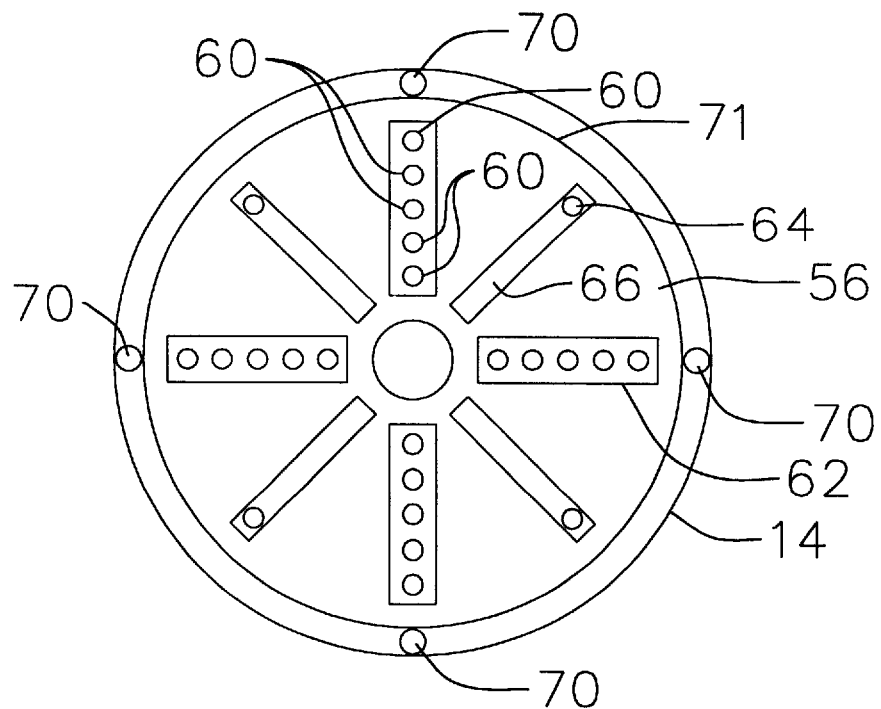
FIG. 4A is an end view of another portion of the housing for supplying and discharging seeds.
Figure 4B:
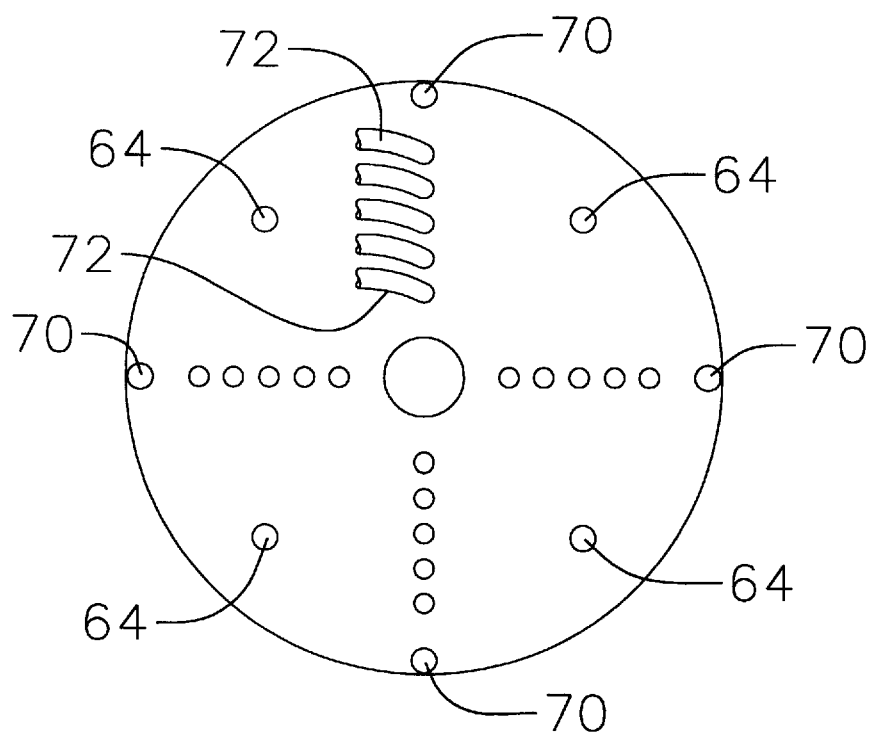
FIG. 4B is an outside view of the housing portion of FIG. 4B.

Turning to FIGS. 1, 4A and 4B the discharge plate 14 is seen as including an inside surface 56 machined smooth and an outside surface 58. The inside surface 56 includes a plurality of discharge openings 60 passing through the discharge plate 14 to the outside surface 58. As shown in FIG. 4A, the discharge openings 60 are arranged in groups of five radially aligned discharge openings 60 spaced at 90° intervals about the inside surface 56. When the discharge plate 14 is assembled to the base plate 16, the discharge openings 60 are located to register with the pressure zone 44 formed by the gaskets 42 on the base plate inside face 28. In a similar fashion as with the base plate 16, the sealing gasket 62 may be formed into a rectangular configuration and disposed about the discharge openings 60 to confine the pressurized gas to the discharge openings 60.

As also seen in FIG. 4A, the discharge plate 14 includes a seed supply bore 64 through which small seeds such as celery or garlic are fed into a radially arranged groove 66 fashioned in the discharge plate inside surface 56. The seeds supplied through the seed supply bore 64 fill each of the seed grooves 66 to provide a supply of seeds to be dispensed by the device 10 according the present invention.

For coupling of the discharge plate 14 to the base plate 16, the discharge plate 14 includes an outside flange 68 adapted to overlay the lip 30. Flange 68 is provided with bores 70 to pass fasteners such as bolts which are received into bores 38 to secure the discharge plate 14 to the base plate 16. Furthermore, the flange 68 defines a circumferential bead 71 which is closely received in the seat 32 on the base plate 16 to seal the discharge plate 14 to the base plate 16. A gasket or other suitable sealer may be disposed between the seat 32 and bead 71 to seal the discharge plate 14 to the base plate 16. The sealing between the discharge plate 14 and the base plate 16 seals the space 34 defined between the inside face 28 of the base plate 16 and the inside surface 56 of the discharge plate 14.

With reference to FIG. 4B, the outside surface 58 of the discharge plate 14 is shown. For each of the discharge openings 16 there is provided a fitting (not shown) to mount a discharge conduit 72. As shown in FIG. B, only one set of discharge openings 60 is shown as having the discharge conduits 72 connected thereto. However, it is to be understood that the other discharge openings 16 would have like connected discharge conduits 72. The discharge conduits 72 extend to the desired location for deposit of a seed such as next to a plow blade or for discharge onto a planting strip. Also shown are the seed supply bores 64 which would have connected thereto suitable fittings (not shown) to feed a supply of seeds through the discharge plate 14 to the seed groove 66 disposed therein.

Figure 3:
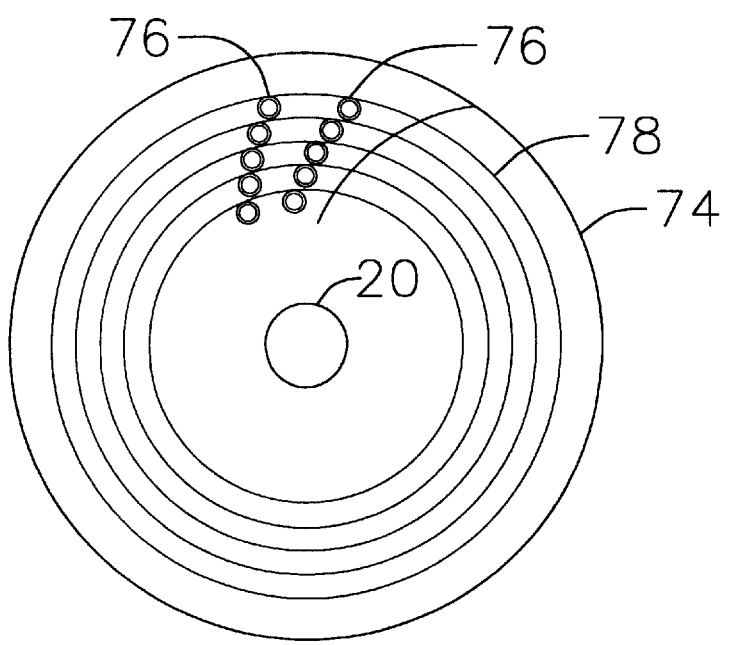
FIG. 3 is a front view of the seed carrier plate for the device.

To collect and transport seeds from the seed supply grooves 66 to the discharge openings 60, the device 10 includes a thin, circular seed carrier plate 36 as shown in FIGS. 1 and 3. Seed carrier plate 36 is fixed to the drive shaft 22 for rotation therewith and is positioned to be disposed in the space 34 to be closely sandwiched between the discharge plate 14 and base plate 16. The seed carrier plate 36 is tightly sandwiched between the aforementioned discharge plate 14 and base plate 16 to seal against the gaskets 42 and 62.

Figure 6A:
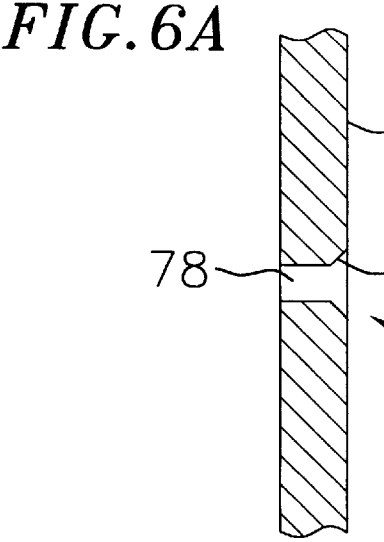
FIG. 6A shows a seed receptacle adapted to receive and transport seeds.
Figure 6B:
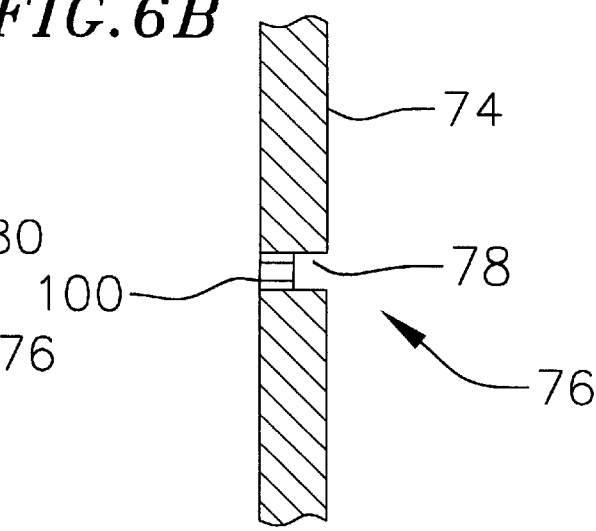
FIG. 6B shows a further embodiment of the receptacle adapted to receive and transport seeds.

As shown in FIGS. 3 and 6, the seed discharge plate 36 has a plurality of seed receptacles 76 arranged in a concentric pattern about the seed carrier plate 36 in somewhat helically arranged sets. As shown in FIG. 3, only two such sets are shown; however, it is to be understood that these sets of seed receptacles are distributed and equally spaced about the circumference of the seed carrier plate 36. Furthermore the seed receptacles 76 are spaced so as to sequentially register with the seed grooves 66 to pick up seeds disposed therein and to transfer them, upon rotation of the seed carrier plate 74, to register with the discharge openings 60. Accordingly the seed receptacles are arranged upon seed receptacle circles 78 which are aligned with the discharge openings 60 of the device 10. Preferably one seed receptacle 76 from a set thereof is disposed to a line with each of the sets of discharge openings 60 at any one time so that four seeds are simultaneously discharged from the device 10 at a time.

It should be understood that the receptacles 76 could be radially arranged such that two receptacles 76 register with discharge openings 60 at a time to discharge eight seeds at a time.

In operation, the device 10 is connected to a power source for rotating the drive shaft 22 such as by connecting it to a tractor power take off or by coupling it to a separate motor or other drive. Seeds are supplied through the seed supply bores 64 to the corresponding grooves 66 to fill the grooves 66 with the seeds which again may be celery, garlic or other small seeds.

Figure 5:
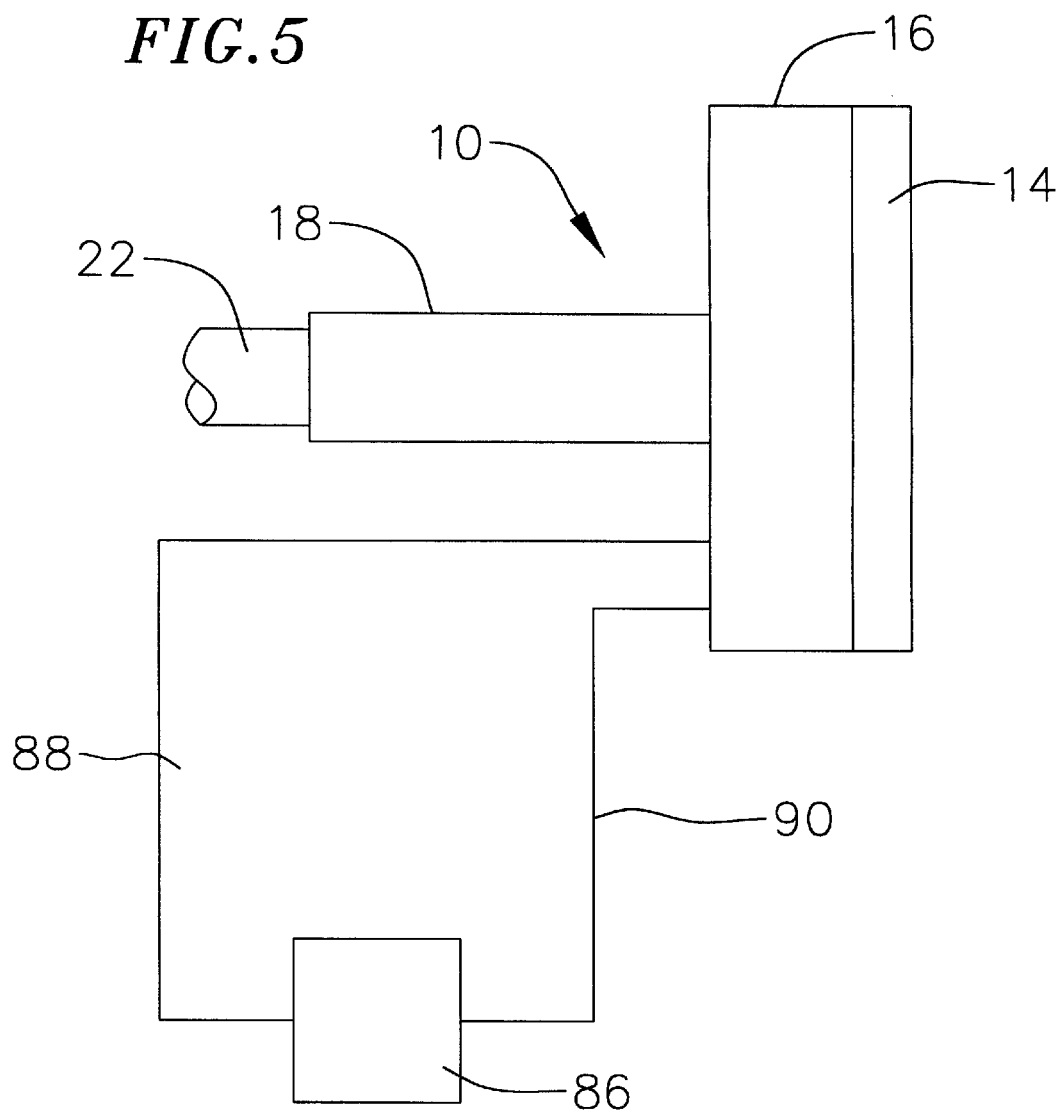
FIG. 5 illustrates a planting system incorporating the device of the present invention.

With reference to FIG. 5, a pressure and vacuum source are provided to provide pressurized air to the pressure conduits 50 and through them to the pressure manifolds 48 and to the pressure bores 40. Similarly a vacuum is applied through the vacuum conduit 54 through the vacuum manifold 52 to the vacuum bores 46. Rotation of the seed carrier plate 74 causes the seed receptacles 76 to register with the seed grooves 66. The seed receptacles 76 (FIG. 6) are fashioned as small bores 78 which open into an enlarged seat 80 sized to receive a seed but prevent it from passing through the bores 78 as shown in FIG. 6A. Alternatively, each receptacle may be embodied as a throughbore with a porous plug 100 in or covering the bore 78 to prevent seeds from passing though the bores 78. As shown in FIGS. 4A and 2A, when the receptacles 76 register with the seed grooves 64, a vacuum is present at that region of the device 10 to draw a seed from the seed groove 64 and register it into a receptacle 76. Accordingly as the seed carrier plate 36 is rotated, seeds are picked up in each of the seed receptacles 76 from the seed grooves 64 by virtue of the vacuum applied through the vacuum bores 46. With reference to FIG. 2A, it is seen that the vacuum imposed by the vacuum bores 46 is present in the sector between adjacent pressure zones 44. Rotation of the seed carrier plate 36 transports the received seeds from the seed grooves 64 over the gaskets 62 and to a corresponding discharge opening 60. At the discharge openings 60, by virtue of the pressure applied at the pressure zones 44 of the base plate 16, as the receptacles 76 align with the discharge openings 60, the pressure at the pressure zones 44 urges the seeds from the receptacles 76 into a corresponding discharge opening 60 and into the discharge conduits 72 for transportation to the planting site or onto a planting tape. Accordingly it can be appreciated as the seed carrier plate 36 is rotated, seeds are picked up from the seed grooves 66, the seeds are held in the receptacle 76 by the imposed vacuum and the seeds are transported to the discharge openings 60 whereat the pressure urges the seeds from the receptacles 76 through a corresponding discharge conduit 72 for planting thereof. Depending upon the orientation of the receptacles 76 and or discharge openings, the number and sequence of seeds discharged through the discharge conduit 72 can be selected.

If desired, and due to any static electrical forces which may be generated due to the passing of air through the discharge conduits 72, water or a mist may be injected into each conduit 72 through a water conduit 82 to dissipate those electro static forces and make sure that each of the seeds 84 (FIG. 1) is transported through the discharge conduits 72.

The drive shaft 22 may be journaled through the discharge plate 14 to support the drive shaft 22.

With reference to FIG. 5, it is seen that the pressure and vacuum is supplied to the device 10 by using a blower 86 having its pressure discharge 88 connected to the pressure conduits 50 and its suction inlet 90 connected to the vacuum conduits 54. Accordingly a single blower 86 may be used to provide the pressure and vacuum necessary to pick up and eject the seeds.

As can be appreciated, the device 10 according the present invention provides a simple construction for efficiently and precisely picking up and discharging small seeds which heretofore have typically been planted using planting strips or broadcasting. Furthermore, the device 10 is adapted to have the pressure and vacuum supplied by a single blower which provides for reduced costs and efficiency.

While I have shown and described certain embodiments of the invention, it is to be understood that it is subject to many modifications and changes without departing from the spirit and scope of the appended claims.

What is claimed is:

1. A seed dispensing device comprising:

a housing including a circular face having four channels disposed at 90° intervals about said face and four discharge opening sets of five radially aligned discharge openings spaced angularly between said channels;

a circular, flat, seed carrier plate having a first side adapted to mate with said face, a second side and twenty four helically arranged sets of five receptacles equi-spaced about said plate such that groups of eight receptacles are, during rotation of said plate, simultaneously and serially in alignment with said channels and said discharge openings to serially discharge groups of eight seeds means for rotating the plate to move said receptacles between said channels and said discharge opening sets;

means for imposing a vacuum at said plate second side from a position where said receptacles register with said channels to a position proximate said discharge opening sets to capture seeds in said receptacles and transport them to the discharge opening sets in response to rotation of said plate; and means for imposing pressure at said plate second side at said discharge opening sets to dislodge said seeds from said receptacles and propel them through said discharge openings of said discharge opening sets.

2. A seed dispensing device comprising:

a housing including a planar, circular face having at least two radially extending seed channels containing seeds and two, angularly spaced intermediate discharge opening sets, each discharge opening set including a plurality of radially spaced discharge openings;

a circular, flat, seed carrier plate having a first side adapted to mate with said face, a second side and a plurality of helically and radially arranged sets of seed receptacles through said seed carrier plate, said seed carrier plate rotatable within the housing, said seed receptacles disposed to position said receptacles of the sets at the channels and to register with discharge openings of the discharge opening sets;

a discharge plate connected to the housing to sandwich the seed carrier plate there between;

means for rotating the seed carrier plate to move said receptacles between said channels and said discharge opening sets;

means for imposing a vacuum at said discharge plate and seed carrier plate second side from a position where said receptacles sets register with said seed channels to a position proximate said discharge opening sets to capture and retain seeds in said receptacles and transport them to said discharge openings; and means for imposing pressure at said discharge plate and seed carrier plate second side at said discharge to dislodge said seeds from said receptacles registered with said discharge openings and propel them through said discharge openings.

3. The seed dispensing device of claim 2 wherein said seed receptacle sets are arranged to simultaneously locate at least one receptacle of said receptacle sets at said seed channels and said discharge opening sets.

4. The seed dispensing device of claim 2 including four channels and four discharge opening sets angularly spaced at 90 degrees apart.

5. The seed dispensing device of claim 2 wherein said seed receptacles are concentrically arranged.

* * * * *